United States Patent

Bigelow

[15] 3,688,556
[45] Sept. 5, 1972

[54] WEAR TESTING APPARATUS
[72] Inventor: Hugh A. Bigelow, Wharton, N.J.
[73] Assignee: The United States of America as represented by the Secretary of the Army
[22] Filed: June 25, 1971
[21] Appl. No.: 156,628

[52] U.S. Cl. .......................................... 73/7, 51/230
[51] Int. Cl. ............................................... G01n 3/56
[58] Field of Search ............................. 73/7; 51/230

[56] References Cited

UNITED STATES PATENTS

| | | | |
|---|---|---|---|
| 2,113,290 | 4/1938 | Benjamin | 73/7 |
| 2,822,686 | 2/1958 | Campana | 73/7 |
| 1,887,527 | 11/1932 | Spindel | 73/7 |
| 2,962,890 | 12/1960 | Borrino | 73/7 |

*Primary Examiner*—Louis R. Prince
*Assistant Examiner*—Daniel M. Yasich
*Attorney*—Harry M. Saragovitz et al.

[57] ABSTRACT

A slide assembly which carries a plurality of wear plates is longitudinally reciprocated in a horizontal plane. Intermediate the ends of the travel of the plates and disposed vertically thereabove, is a specimen holder block which supports a generally hollow cylindrical specimen holder. A weighted mass is inserted into the upper end of the holder and bears downwardly on a specimen carrier through an intermediate block. The carrier is formed with a central aperture for confining therein a spherical member that extends outwardly thereof and rides against the specimen disposed on the opposite side of the carrier. The carrier face is recessed so as to provide a specimen confining area which includes four outwardly extending flange walls with the corner portions thereof deleted and of dimensions somewhat greater than the specimen. This structure in conjunction with the spherical member, permits the specimen all the necessary degrees of freedom as it slidingly abuts the wear plate. Additionally, there are disclosed means for releasably securing both the intermediate block and the specimen while loading in proper position, of the specimen holder prior to operational testing. A spring loaded alternate structure may be substituted for the weighted mass and which structure may include a depth indicator for providing direct, continuous wear data.

8 Claims, 4 Drawing Figures

INVENTOR
HUGH A. BIGELOW

INVENTOR
HUGH A. BIGELOW

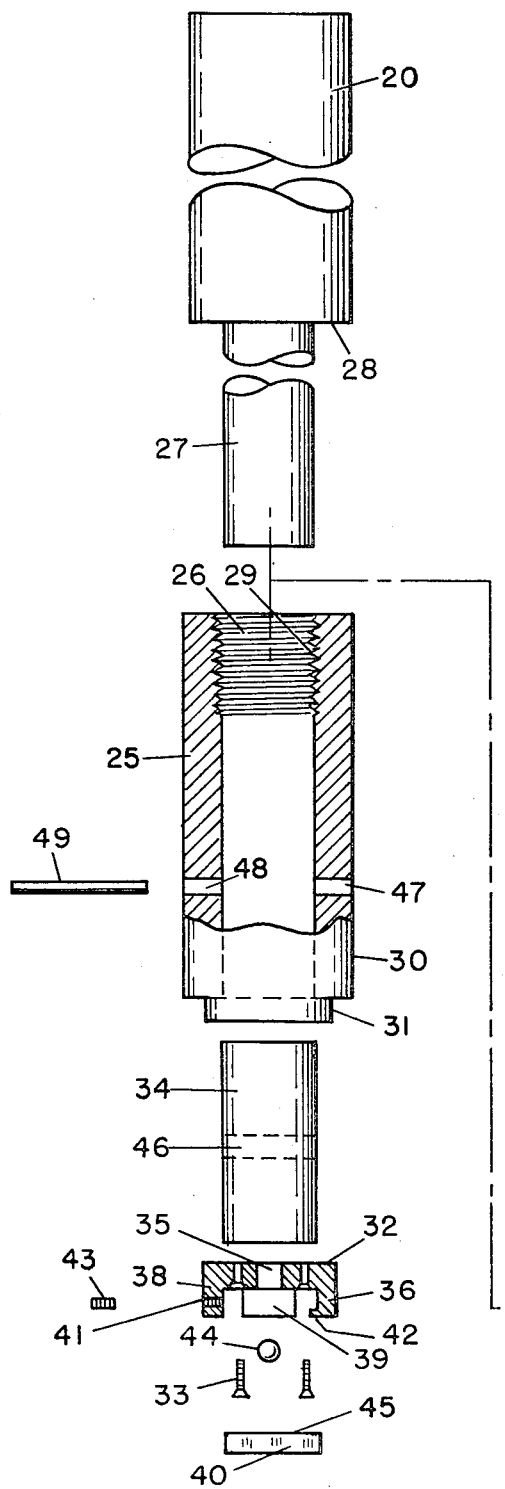
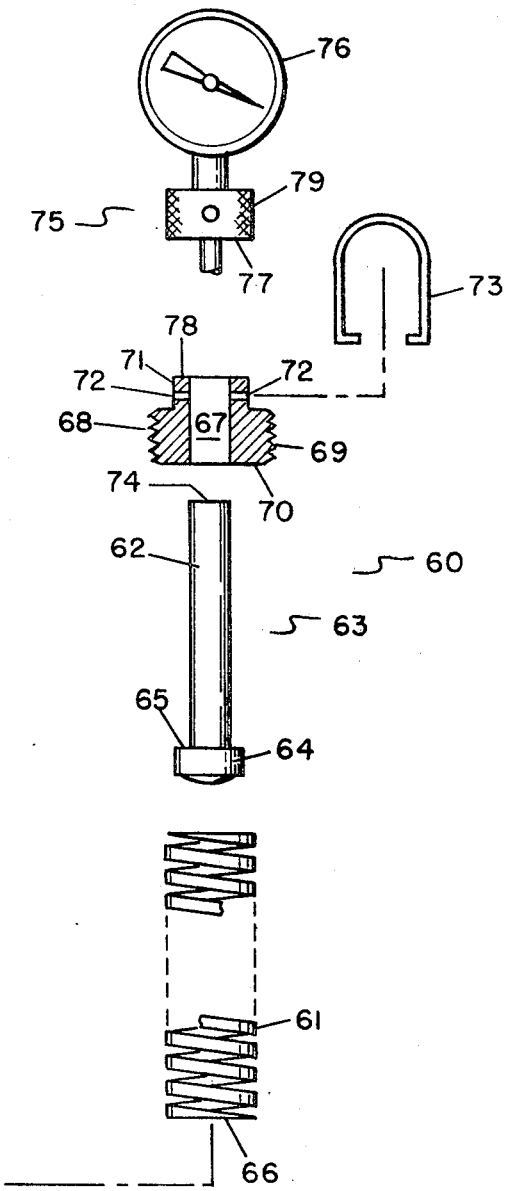
FIG. 3
FIG. 4
INVENTOR
HUGH A. BIGELOW

WEAR TESTING APPARATUS

The invention described herein may be manufactured, used and licensed by or for the Government for governmental purposes without the payment to me of any royalty thereon.

BACKGROUND OF THE INVENTION

The present invention relates to wear testing apparatus and more particularly pertains to a wear testing machine in which the specimen is supported in a fashion so as to simulate the wear induced by manual operation or, use as in inspection gaging.

In the field of simulated wear testing, it has been the general practice to employ prior art devices to measure abrasive type wear. Where special circumstances are inherent in the actual wear, the apparatus is fabricated to particularly simulate these field conditions. None of these present devices however, are capable of simulating hand operation of tools or in particular a gaging instrument. This necessitates a support which imparts to the test specimen a floating condition or alternately stated, a plurality of degrees of freedom. It thus being possible to evaluate the number of consecutive gaging manual operations to which a tool can be subjected prior to its being worn to the degree wherein it fails to ascertain the desired accuracy of the gage itself.

SUMMARY OF THE INVENTION

The general purpose of this invention is to provide a wear testing apparatus that has all the advantages of similarly employed prior art devices and has none of the above described disadvantages. To attain this, the present invention provides a unique loading and support structure for the specimen which is disposed above and proximate a reciprocating wear plate so as to permit abutting, sliding contact with the specimen. The holder assembly includes a hollow cylindrical tube vertically supported and carrying at its upper portion a weighted mass which bears against an intermediate block that in turn is affixed to the back of the specimen carrier so as to transmit the weight of the mass to the specimen. The specimen carrier is essentially a square member with a central recess within which the specimen is freely disposed. In order to impart pivotal movement to the specimen there is provided a central aperture in the specimen carrier in which is disposed a spherical member that extends slightly outwardly thereof and contacts the back wall of the specimen.

An object of the present invention is to provide a simple, inexpensive and reliable wear testing apparatus whose operation simulates wear induced by, or resulting from, manual operation.

Another object is to provide a linear wear testing device wherein the specimen abrades against a wear plate under a selectable load and is permitted to "float" relative thereto.

Still another object is to provide a specimen holder for a wear testing apparatus which permits the specimen to freely abrade the wear plate under limited relative movement in all possible planes during intermittent transverse travel.

Other objects and many of the attendant advantages of this invention will be readily appreciated as the same becomes better understood by reference to the following detailed description in connection with the accompanying drawings.

BRIEF DESCRIPTION OF THE DRAWINGS

FIG. 3 is an exploded, assembly view of the specimen holder partially in section; and FIG. 4 is an exploded view of an alternate loading mechanism for the holder of FIG. 3.

DESCRIPTION OF A PREFERRED EMBODIMENT

Figure 1:
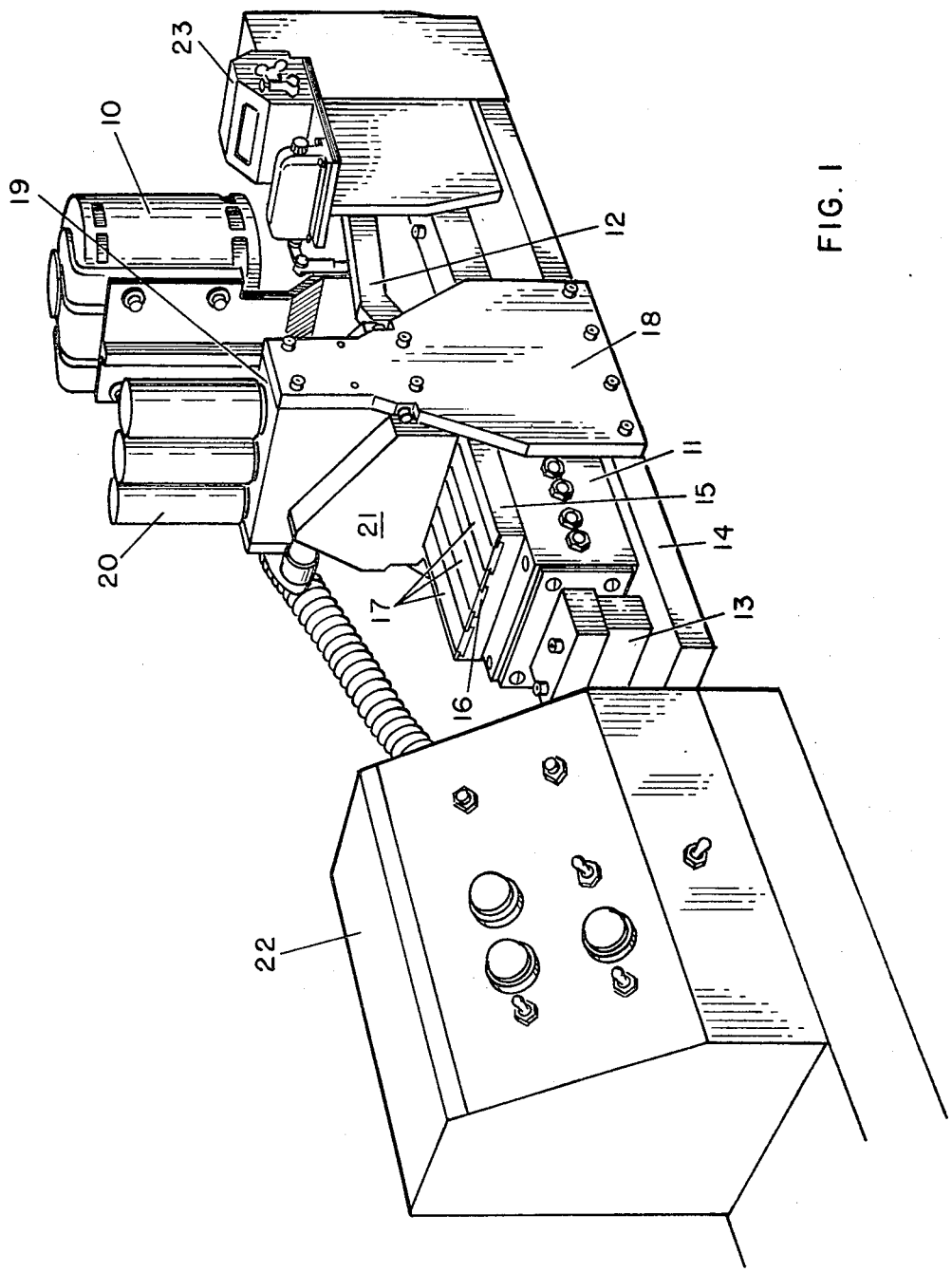
FIG. 1 is a perspective view of an embodiment made in accordance with the principle of the present invention.

In the illustrated embodiment of FIG. 1 an electric motor 10 provides reciprocating motion to a slide assembly 11 through a shaft and crank coupling (not shown) via a connecting rod 12. The slide assembly rides on a raised support base 13 that is affixed to a rigid bed 14 and carries for movement therewith, on its upper face, an adapter plate 15. The plate is formed with a plurality of longitudinal grooves 16 which are each adapted to receive and hold spaced apart wear plates 17. Disposed intermediate the ends of the slide assembly travel points is a vertical retainer member 18 which is provided with a plurality of depending openings 19 aligned with the wear plates. These openings can be formed with upper inner threads (not shown) for fixedly confining therein one of the specimen holders. Positioned within each opening is a holder assembly detailed in FIGS. 3 and 4, which includes a weighted mass 20 extending upwardly therefrom. Disposed on either lateral side of the retainer 18 are a pair of fluid flow directing means 21 which are open in a direction so as to suitably direct a flow of selectable temperature fluid, such as air, to or from (vacuum) the testing area and thereby remove any resulting debris or contaminants. Additionally, other fluids such as abradents or wear reducing compounds can be included during the tests for evaluation. A control console 22 coupled through counter 23 is employed to permit automatic operation under controlled and selected conditions such as overall preset time through a fixed number of strokes. Consoles of this variety are well known in the art and are readily available for performing the desired functions with a minimum of modifications. Thus, there is disclosed a selectably operable device for reciprocating a plurality of wear plates with means for supporting a specimen holder thereabove.

Figure 2:
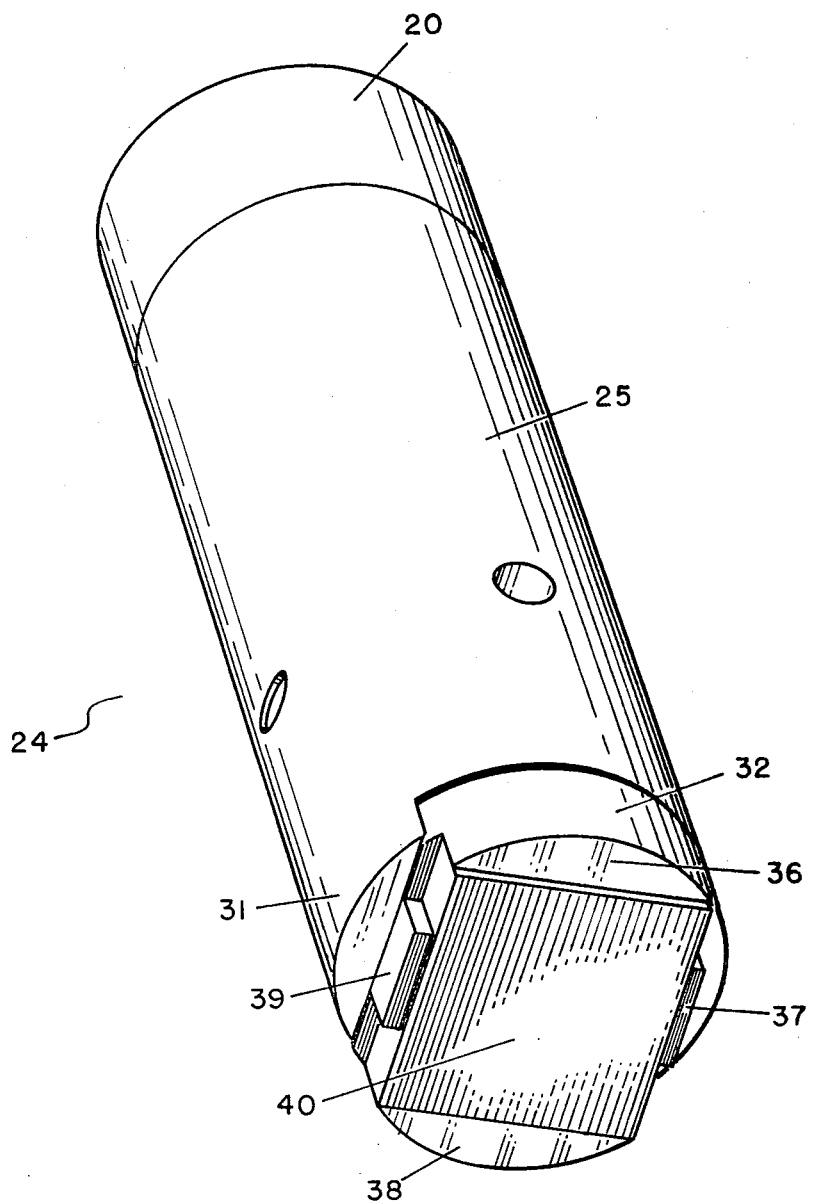
FIG. 2 is a perspective of the specimen holder.

Referring now to FIGS. 2 and 3 which detail the holder assembly 24 and which includes a specimen holder member 25. The specimen holder is generally a hollow cylinder having a central passage 26 therethrough. The weighted mass 20 is provided with a forward end 27 of reduced diameter that is slidingly insertable into the holder to a limited depth fixed by the abutment shoulder 28. The internal holder wall at the upper end is provided with threads 29 to accommodate the alternate load of FIG. 4. The lower end 30 of the holder is formed with a pair of opposing, depending flanges 31 for accepting loosely therebetween the specimen carrier 32 which is affixed to an intermediate block 34 by a pair of screws 33 that extend through the specimen holder and thread into mating holes in the block. The specimen holder 32 is provided with a central aperture 35 and four depending flange walls 36–39 with corner portions therebetween deleted thus, effectively forming a cavity or recess for confining therein the specimen 40. The spacing between opposed flange walls is slightly larger than the specimen 40 thereby permitting limited movement thereof. One wall 38 of the specimen carrier 32 is formed with a threaded aperture 41 therethrough so that, in conjunction with the inwardly extending lip 42 of wall 36, the specimen may be releasably retained within the carrier cavity by threading screw 43 into aperture 41 and having its leading edge bear tightly against the opposed specimen side wall. Spherical member 44, which may be in the form of a ball bearing and is disposed in specimen carrier aperture 35 is of a dimension such that a portion thereof extends outwardly when it abuts block 34 and abuts the inner face 45 of the specimen. Thus it is clear that when the specimen is released by loosening screw 43 it will freely pivot on the bearing 44 and follow the contours of the wearing surfaces much as that encountered by manual action. With the specimen confined within the carrier and the carrier affixed to the intermediate block 34, the intermediate block is inserted into the lower end of the holder 25. The block 34 is provided with an enlarged transverse aperture 46 that is aligned with opposed openings 47 and 48 in the holder thus permitting pin 49 to pass therethrough and hold the block 34. Since the aperture 46 is larger than the pin 49, the block will have limited longitudinal movement within the holder. After assembly, each holder 25 and its associated weighted mass 20 are placed into the opening 19 in the retainer member 18 so that the specimen rests directly on the wear plate, and the screw 43 is then released so that the specimen is free, within limits, to pivotally ride on the wear plate with a pressure dependent on the weight load thereabove.

In the alternate load, illustrated in FIG. 4, the weighted mass is deleted and the spring load assembly 60 is substituted therefor. The tension member or coil spring 61 is disposed about the shank 62 of the pressure rod 63 with the head 64 extending outwardly thereof so that the shoulder 65 bears against the outer terminal coil 66 of the spring. The upper end of the shank 62 extends through a central aperture 67 in the tension control member 68 which, in this embodiment, is a screw provided with external threads 69 that mate with the internal threads 29 of opening 26 of holder member 25. In this position the spring is confined between the head 64 and the inner annular face 70 of member 68 with the spring tension determined or selected by the distance the screw is threaded into the opening 26. When this portion of the assembly is inserted into the holder 25, the face of head 64 bears against block 34 and thereby applies the spring tension force to the specimen and provides a selectable pressure between the specimen and the wear plate. The upper face of the member 68 is provided with an upwardly extending extension 71 of reduced diameter having a pair of transverse holes 72 to receive and engage with loop 73 by means of which the screw may be threaded when below the upper surface of the holder 25. The upper flat face 74 of rod 62 is confined within the screw and disposed in abutting relation thereto is a displacement assembly 75 whose indicator 76 shows the displacement of the face of the rod from an initial setting with face 77 in contact with the upper edge 78 of reference member 79. This indicated variation is related directly to the wear that has taken place on the specimen.

The entire assembly, when suitably loaded, provides a means for holding the test specimen in a floating condition analogous to manually holding a gage or other tool. Thus the specimen is spaced from the upper inner surface of the specimen carrier 32 by the sphere 44 which protrudes outwardly from the carrier aperture 35 since it abuts the block 34. The specimen fits or is held loosely within the carrier whose recess is slightly larger than the dimensions of the specimen, as for example, by 0.005 inches. Since the drive system for the wear plates provides a reciprocating (intermittent) motion, the specimen is picked up at both ends of its travel to thus simulate the proper movement. This difference in dimensions in addition to the pivotal sphere contact allows the specimen to describe the following motions:

1 - linear translation
2 - lateral translation
3 - pivot about the vertical
4 - pivot about the horizontal
5 - lateral pivot
6 - vertical translation The conditions that induce one or more of these motions are 1. wear plate irregularities
2. variations in wear plate thickness in any direction, warp, twist, bowing, non-homogenity of the materials, grain size, incomplete metallic hardening
3. foreign matter in areas of contact. It is clear from the above that due to the conditions of constraint placed on the specimen, the specimen conforms to, intimately contacts and follows the surface of the wear plate as precisely as is possible and thereby simulate the interaction of a hand held gage and a workpiece.

It should be understood, of course, that the foregoing disclosure relates to only a preferred embodiment of the invention and that numerous modifications or alterations may be made therein without departing from the spirit and the scope of the invention as set forth in the appended claims.

I claim:

1. In a wear testing apparatus for simulating manually induced wear, wherein a wear plate is horizontally reciprocated by a drive means that improvement which comprises:

a specimen holder assembly for supporting a specimen while freely permitting limited translation and pivotal movement thereof and including pressure means for applying a selected pressure between said specimen and said wear plate, retainer means for supporting said holder assembly in a position wherein said specimen and wear plate are in abutting relation, said holder assembly includes a specimen carrier for holding and confining said specimen proximate one face thereof for limited transverse movement, said specimen carrier being provided with a central aperture in said one face, a spherical member confined in said aperture and having a portion thereof extending outwardly thereof for permitting pivotal movement of said specimen when said spherical member is intermediate said one face and said specimen.

2. The improvement according to claim 1 wherein said carrier is provided with a recess larger than said specimen for receiving said specimen and having portions of the walls defining said recess deleted and including means for releasably holding said specimen.

3. The improvement according to claim 2 wherein said means for releasably holding includes one of said walls formed with an inwardly directed lip and means for forcefully directing said specimen against said one of said walls.

4. The improvement according to claim 3 wherein said holder assembly includes a hollow cylindrical holder member and having disposed for limited movement therein an intermediate block having one end thereof affixed to said one face of said carrier and means for applying a selected pressure to the other end of said block.

5. The improvement according to claim 4 wherein said means for applying pressure is a weighted mass disposed for contact with said block.

6. The improvement according to claim 4 wherein said means for applying pressure comprises:

a pressure rod having an enlarged head at one end thereof and a shank portion, a locking member disposed about said shank and adjustable lengthwise thereof, and having means for being releasably affixed to said holder member, a tension means disposed intermediate said head and said locking member, whereby when said means for applying pressure is inserted into said holder member said head will exert a selected pressure against said intermediate block.

7. The improvement according to claim 6 wherein said means for being releasably affixed includes external threads on said locking member for mating with threads on the inner wall of said holder member.

8. The improvement according to claim 7 wherein said locking member is provided with a central aperture through which said shank extends and further including a displacement indicator in contact with the upper end of said shank for indicating the displacement thereof resulting from wear of said specimen.

* * * * *